(12) United States Patent
Runyon et al.

(10) Patent No.: US 10,470,014 B2
(45) Date of Patent: Nov. 5, 2019

(54) CENTRAL AND SECURITY ACCESS CONTROL PROVISIONING

(71) Applicant: Intel Corporation, Santa Clara, CA (US)

(72) Inventors: Jeff Runyon, Queen Creek, AZ (US); Donald Males, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/997,831

(22) Filed: Jun. 5, 2018

(65) Prior Publication Data

US 2019/0045338 A1 Feb. 7, 2019

Related U.S. Application Data

(60) Provisional application No. 62/558,207, filed on Sep. 13, 2017.

(51) Int. Cl.
| | |
|---|---|
| *H04W 4/50* | (2018.01) |
| *H04W 4/70* | (2018.01) |
| *H04L 29/08* | (2006.01) |
| *G06F 8/65* | (2018.01) |
| *H04W 12/08* | (2009.01) |

(52) U.S. Cl.
CPC ............ *H04W 4/50* (2018.02); *G06F 8/65* (2013.01); *H04L 67/34* (2013.01); *H04W 4/70* (2018.02); *H04W 12/08* (2013.01)

(58) Field of Classification Search
CPC ...................................... H04W 4/50
USPC ...................................... 455/418
See application file for complete search history.

(56) References Cited

U.S. PATENT DOCUMENTS 8,831,568 B2 * 9/2014 Cherian ............... H04W 4/70
455/411
2013/0077534 A1 * 3/2013 Hu ..................... H04L 41/5054
370/259

* cited by examiner

*Primary Examiner* — Joel Ajayi
(74) *Attorney, Agent, or Firm* — Jordan IP Law, LLC

(57) ABSTRACT

Embodiments of systems, apparatuses and methods may provide for technology to provision data associated with a plurality of devices, detect a first machine-to-machine update request with respect to a first device in the plurality of devices, and automatically update at least a portion of the provisioned data in response to the first machine-to-machine update request. In one example, the provisioned data includes one or more of applications, encryption keys or digital certificates. Other embodiments are disclosed and claimed.

22 Claims, 11 Drawing Sheets

CENTRAL AND SECURITY ACCESS CONTROL PROVISIONING

CROSS-REFERENCE TO RELATED APPLICATIONS

This application claims benefit of U.S. Provisional Patent Application No. 62/558,207 filed Sep. 13, 2017.

TECHNICAL FIELD

Embodiments generally relate to security systems. More particularly, embodiments relate to central and security access control provisioning.

BACKGROUND

There may be many disparate provisioning bodies and that may be increasing exponentially with the explosion of the Internet of Things (IoT). There is no one single authority linking these together to create a secured ubiquitous environment for IoT and personal devices. Replacing devices (personal or IoT) is extremely difficult because users need to remember where all the applications and provisioning bodies reside to get their new device running. Conventional solutions may use Active Directory (AD), public key infrastructure (PKI) and Signing facilities as a De facto Standard, which may not be sustainable in the future. These systems were developed and intended for business use and were intended to be a bridge between humans and devices. This dynamic has changed with the implementation of IoT, machines independent of humans. Additionally, IoT developer's devices may be creating their own custom provisioning bodies.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Central Provision Authority Examples

Figure 1:
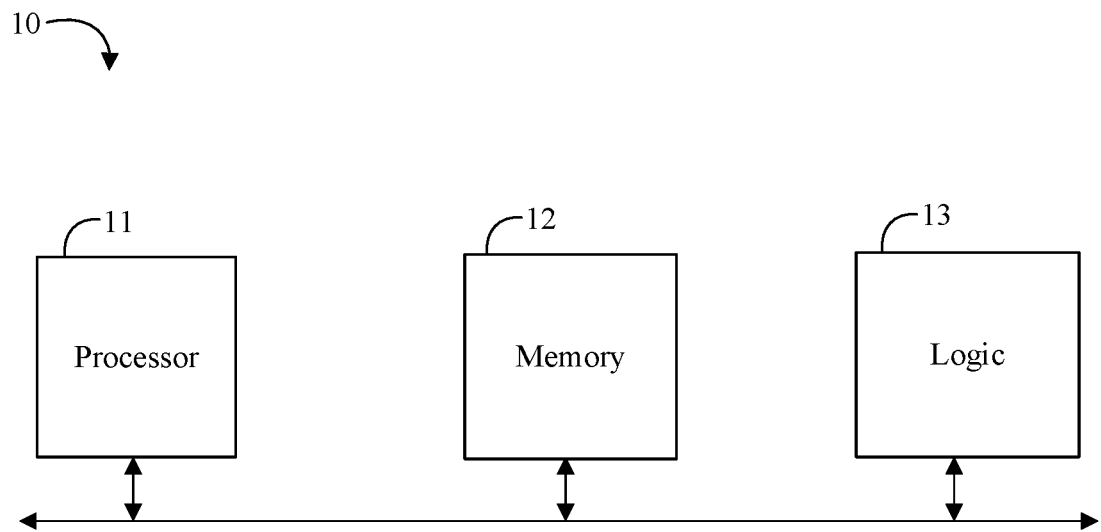
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to provision data associated with a plurality of devices, detect a first machine-to-machine update request with respect to a first device in the plurality of devices, and automatically update at least a portion of the provisioned data in response to the first machine-to-machine update request. For example, the provisioned data may include one or more of applications, encryption keys, secured links or digital certificates. In some embodiments, the logic 13 may be further configured to detect a machine-to-human update request with respect to a second device in the plurality of devices, and automatically update at least a portion of the provisioned data in response to the machine-to-human update request. Alternatively, or additionally, the logic 13 may be further configured to detect a human-to-machine update request with respect to a third device in the plurality of devices, and automatically update at least a portion of the provisioned data in response to the human-to-machine update request. In some embodiments, the logic 13 may also be configured to detect a second machine-to-machine update request with respect to a first user account in the plurality of user accounts, and automatically update at least a portion of the provisioned data in response to the second machine-to-machine update request. In any of the embodiments herein, the logic 13 may also be configured to securely store the provisioned data to a central repository. In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, provisioning data associated with a plurality of devices, detecting a first machine-to-machine update request with respect to a first device in the plurality of devices, automatically updating at least a portion of the provisioned data in response to the first machine-to-machine update request, etc.).

Figure 2:
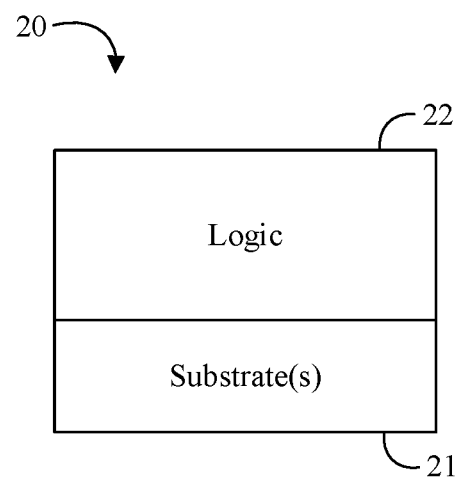
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to provision data associated with a plurality of devices, detect a first machine-to-machine update request with respect to a first device in the plurality of devices, and automatically update at least a portion of the provisioned data in response to the first machine-to-machine update request. For example, the provisioned data may include one or more of applications, encryption keys, secured links or digital certificates. In some embodiments, the logic 22 may be further configured to detect a machine-to-human update request with respect to a second device in the plurality of devices, and automatically update at least a portion of the provisioned data in response to the machine-to-human update request. Alternatively, or additionally, the logic 22 may be further configured to detect a human-to-machine update request with respect to a third device in the plurality of devices, and automatically update at least a portion of the provisioned data in response to the human-to-machine update request. In some embodiments, the logic 22 may also be configured to detect a second machine-to-machine update request with respect to a first user account in the plurality of user accounts, and automatically update at least a portion of the provisioned data in response to the second machine-to-machine update request. In any of the embodiments herein, the logic 22 may also be configured to securely store the provisioned data to a central repository. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
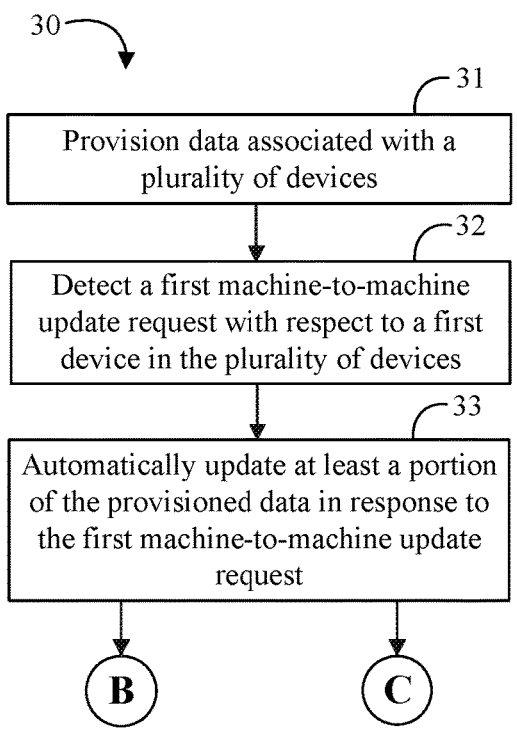
FIGS. 3A to 3C are flowcharts of an example of a method of provisioning data according to an embodiment.
Figure 3B:
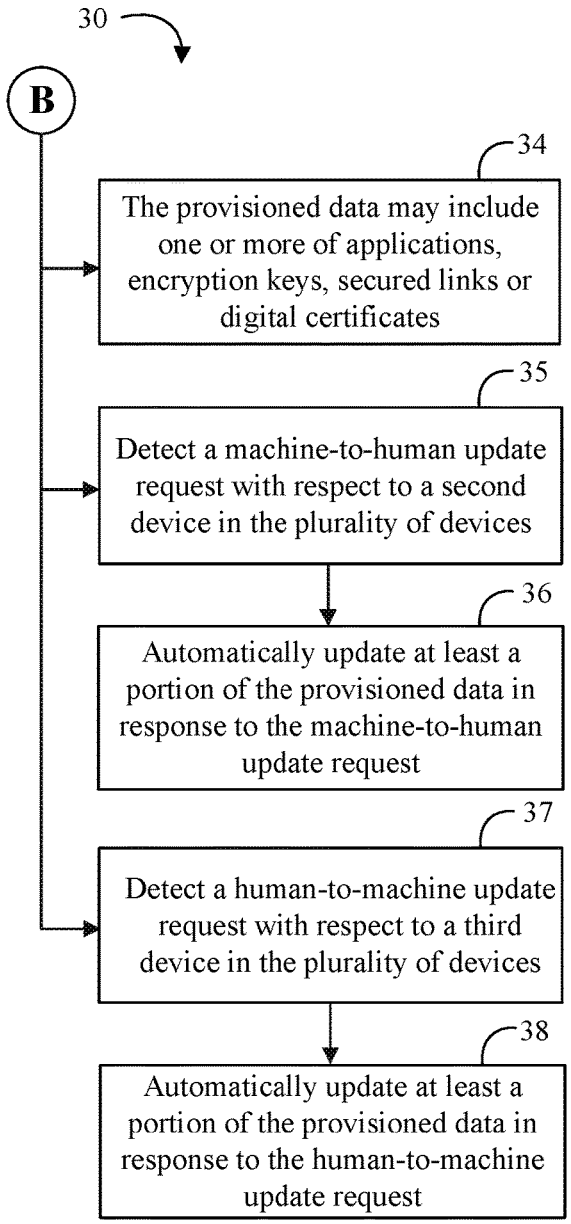
Figure 3C:
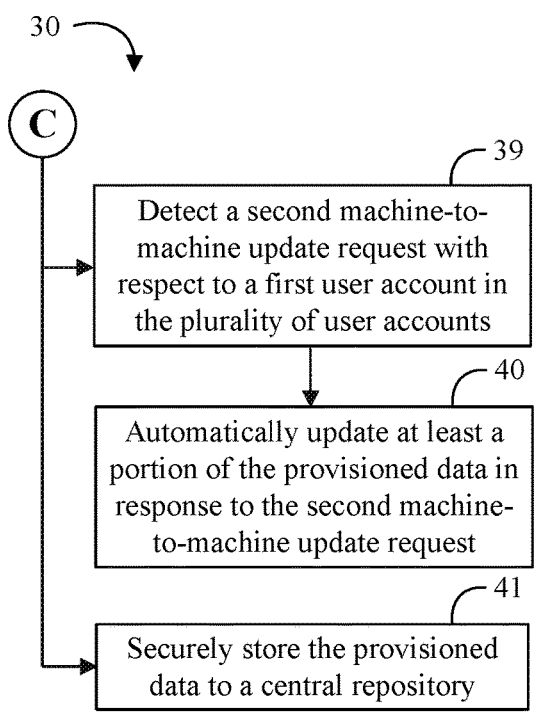

Turning now to FIGS. 3A to 3C, an embodiment of a method 30 of provisioning data may include provisioning data associated with a plurality of devices at block 31, detecting a first machine-to-machine update request with respect to a first device in the plurality of devices at block 32, and automatically updating at least a portion of the provisioned data in response to the first machine-to-machine update request at block 33. For example, the provisioned data may include one or more of applications, encryption keys, secured links or digital certificates at block 34. Some embodiments of the method 30 may further include detecting a machine-to-human update request with respect to a second device in the plurality of devices at block 35, and automatically updating at least a portion of the provisioned data in response to the machine-to-human update request at block 36. Alternatively, or additionally, the method 30 may include detecting a human-to-machine update request with respect to a third device in the plurality of devices at block 37, and automatically updating at least a portion of the provisioned data in response to the human-to-machine update request at block 38. Some embodiments of the method 30 may also include detecting a second machine-to-machine update request with respect to a first user account in the plurality of user accounts at block 39, and automatically updating at least a portion of the provisioned data in response to the second machine-to-machine update request at block 40. Any of the embodiments of the method 30 may further include securely storing the provisioned data to a central repository at block 41.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS). Additionally, logic instructions for the method 30 might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide a central provisioning authority. In some computing environments, there may be many disparate provisioning bodies (e.g., which may be increasing substantially with the development of the internet-of-things (IoT)). Conventionally, there is no one single authority linking different provisioning bodies together to create a secured ubiquitous environment for IoT and personal devices. Accordingly, replacing devices (personal or IoT) may be extremely difficult because the user needs to remember where all the applications and provisioning bodies reside to get the new device running. Some stop gap technologies may include active directory, PKI and signing facilities, etc. These systems may be intended for business use to be a bridge between humans and devices. However, this dynamic has changed with the implementation of IoT, which may include machines independent of humans. Additionally, some IoT devices may include their own custom provisioning bodies.

Some embodiments may advantageously provide a central provisioning repository where device and user's applications, keys and certificates may be securely stored. As new applications, keys and certificates are added they may be securely updated in the repository. In the event that a device or user is replaced, the central provisioning authority may provide a secured way to reload all the device applications, keys and certificates (e.g., either natively from the central provisioning authority or through secured links to other provisioning authorities).

For example, some personal devices may include applications, keys, certificates, etc. that may be added over time. In the event that a device is upgraded or replaced, conventionally there may be no mapping of what applications, keys and certificates that were previously loaded on the device and the end user has to remember and slowly add what was previously installed one at a time as they realize what is missing. Some embodiments of a central provisioning authority may allow for a secured one stop shop to quickly reload everything back to the device. Additionally, some embodiments of a central provisioning authority may create a bridge between IoT provisioning bodies to fully expand interoperability through trusted connection between all IOT devices.

Figure 4:
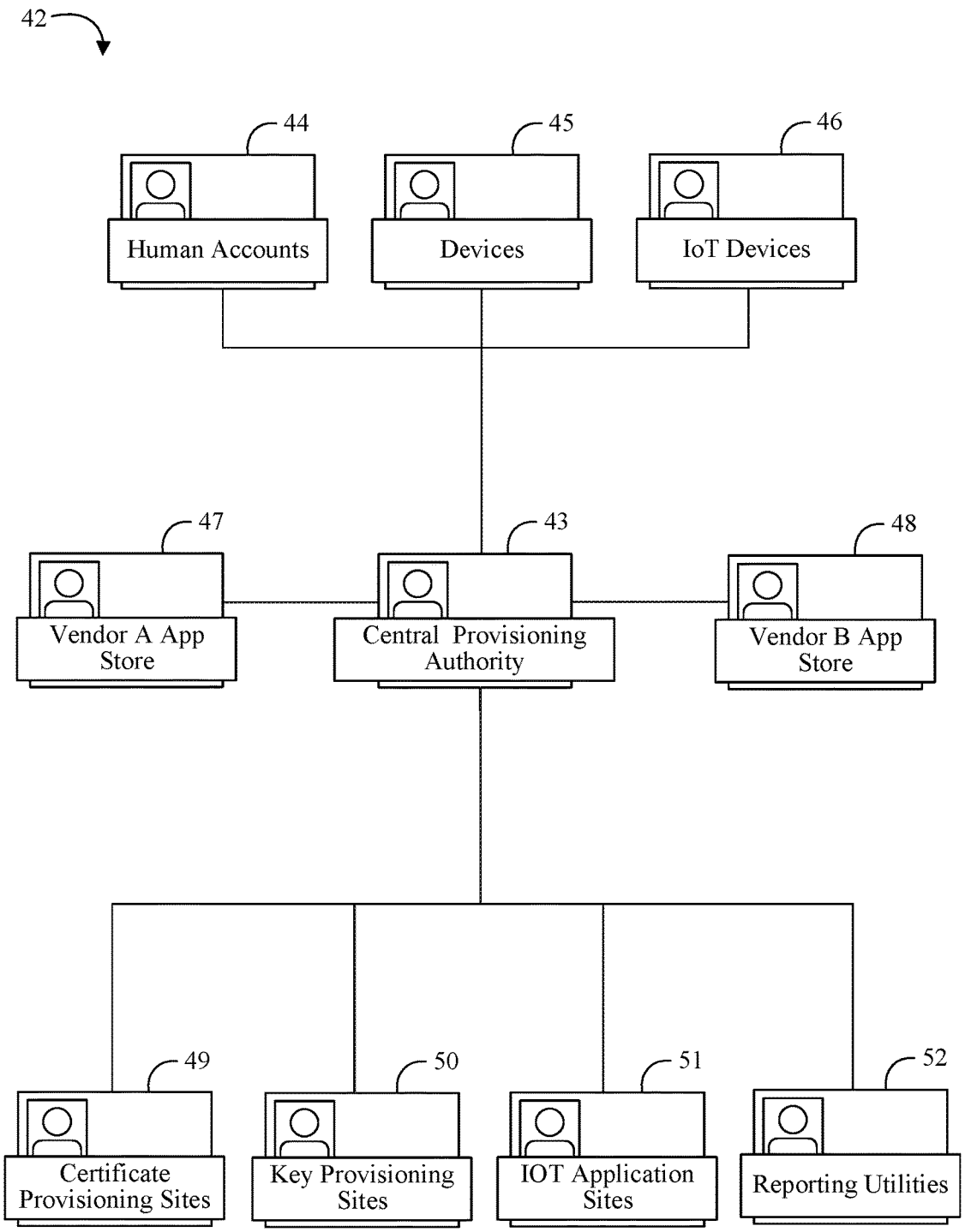
FIG. 4 is a block diagram of an example of a computing environment according to an embodiment.

Turning now to FIG. 4, an embodiment of a computing environment 42 may include a central provisioning authority (CPA) 43 communicatively coupled to one or more provisioning clients. For example, the one or more provisioning clients may include human accounts 44, devices 45, IoT devices 46, vendor application stores 47 and 48 (e.g., GOOGLE PLAY STORE, APPLE STORE, etc.), certificate provisioning sites 48, key provisioning sites 49, IoT application sites 50, and reporting utilities 52. Those skilled in the art will appreciate that the environment 42 is only an illustrative example and other environments may have more or fewer clients and/or different types of clients.

Advantageously, some embodiments of an architecture of the CPA 43 may include a central provisioning repository where device and user's applications, keys and certificates may be securely stored. As new applications, keys and certificates are added they may be securely updated in the repository. In the event that a device or user is replaced the CPA 43 may provide a secured way to reload all the device application, keys and certificates. In some cases, the re-provisioning may be performed natively from the CPA 43. In some cases, the re-provisioning may be performed through secured links to other provisioning authorities.

For the human accounts 44, some embodiments of the CPA 43 may provide a secure application to allow the registration/enrollment of new devices/accounts and/or a secure application to replace a device and provision a new replacement device. For the devices 45 and/or IoT devices 46, some embodiments of the CPA 43 may provide a secure application to allow the temporary registration/enrollment of temporary devices/accounts, a secure application to allow devices to update their profiles without human interaction, and/or a secure application for devices to authenticate themselves between each other (e.g., one brand of connected vehicle talking to another brand of connected vehicle). For the vendor application stores 47 and 48, some embodiments of the CPA 43 may provide secure brokerage to allow download of replacement applications. For the various certificate/key provisioning sites, some embodiments of the CPA 43 may provide secure brokerage to allow transfer of certificates and keys.

A user may be excited when they get a new phone or device, anticipating getting to try out all the new features and experience the latest graphics, etc. Such excitement, however, may turn to frustration when they realize that all the programs from their old phone/device might be missing (e.g., which may not be discovered until just before they need it to accomplish an important task). As the world continues to evolve into the realm of IoT the gap may continue to widen beyond simply missing applications from a new device. IoT may need to rely heavily on trusted connections because some interactions may no longer be just human and machine to another human and machine. Some interactions may include machine to machine, human to machine, and machine to human. These additional interactions may introduce a whole new level of complexity on how a user/device determines whether to trust or authenticate the connections and data exchanges.

Traditionally active directory (AD) has been a de facto standard provisioning body that allows user accounts access to everything from access to controlled content to remote connection and management of servers and other computers. Public key infrastructure (PKI) has been the de facto standard for certificate management. Certificates allow the encryption and decryption of data packets (e.g., e-mail, a command from a server to another device, etc.). There really isn't one standard for managing keys. A key may be used to unlock communication between devices. Both devices need to trade and validate that their keys match before communication begins. An example of this is an identification badge may have a key that matches a key on a badge reader before any data can be passed. Signing facilities may be similar to a certificate authority like PKI but may be specific to an industry or product.

For less complex computing environments, conventional provisioning may have been sufficient to manage the environment because it was held together with human glue. For example, a human may create accounts, approve access and manage the certificate and key authorities. With the emergence of IoT and the public sector, however, there may be no such glue to hold the broader ecosystem together where there may be a combination of humans and machines to provision. For example, IoT may require provisioning billion of devices and not simply humans and their associated machines.

Some embodiments may support the implementation of a central governing body or provisioning authority (PA) that may address many of these problems (e.g., and problems on the horizon). For example, a virtual vault may include one or more virtual safe deposit boxes. For example, the vault may correspond to a central PA (CPA), and the safe deposit boxes may correspond to a device, person or account and all of its attributes (applications, certificates, keys, etc.). For different environments, there may be different configurations of a CPA. For example, a business PA (BPA) may be geared to business systems and applications typically inside a firewall. A public PA (PPA) may be focused on the public sector (e.g., non-firewalled certificates and applications).

In some embodiments, access to the vault may still leverage AD. However, like a bank, access to the safety deposit box may take multiple keys, and/or multiple forms of identity authentication. This multi-factor authentication may include a combination of AD credentials, passwords, personal identification number (PIN), biometric, etc. for humans and their devices. For IoT the initial connection may come from the safe deposit box to the device (e.g., initially requiring human intervention, but automated thereafter).

The virtual safe deposit box may store virtual valuables such as applications, keys, and certificates loaded on a smart device, or what represents an IoT device. The virtual valuables may include smart device authentication information. For example, an autonomous vehicle may receive a command from another autonomous vehicle that is interpreted as a command to speed up, or stop. Trust and authentication are important to these operations.

The PA may advantageously provide a repository and registry of every application, certificate and key on a device/system (e.g., similar to a connected back-up). In some instances, the repository may store actual copies and in other instances the repository may store a virtual link to the appropriate provisioning authority. Advantageously, the user/device does not need to know where all of the applications, certificates and keys are coming from.

Stepping back to the original problem, a device may be lost, stolen, or damaged. Two considerations include how to land the device in the environment and set up the safe deposit box, and also how to replace that device in the future and get the new device up and running. To create a new safe deposit box (devices, accounts, etc.), some embodiments may provide secured technology where a combination of personal credentials and the provisioning authority credentials may be utilized to create the safe deposit box. In the case of IOT, a human may initially create the safe deposit instance like a personal device. The process may be automated in the future so the IoT device may securely register itself.

If a user's device gets damaged or stolen (e.g., or they simply get a new device), the user may launch a provisioning application to setup the new device (e.g., or a new IoT device). Once launched the user may authenticate their access to the vault and use a multi-factor authentication to gain access to the safe deposit box. From the safe deposit box, depending on what is stored natively and what is stored as a link, the new device may automatically start rebuilding its profile. The user may be prompted through what was previously loaded to determine what they want reloaded. Authentication codes may be passed to the appropriate provisioning bodies and the user may be stepped through the process of reloading applications, keys and certificates. At the end of the new build a randomly generated strong key may be assigned to the new device so as new applications, certificates and keys are loaded the new device may automatically keep in sync with the safe deposit box. Additionally, each time the device negotiates access to the safe deposit box, the CPA may randomly generate a new strong key and retire the previous key.

Some embodiments of a CPA may not be intended to be a provisioning authority itself, but rather to simply provide a bridge to applications and other provisioning authorities. Through trusted and authenticated connections, for example, some embodiments of a CPA may negotiate, on behalf of an authenticated device and human account to manage your applications, certificates and keys.

Within the business or government environment behind fire walls, having an embodiment of a secured central repository BPA for these device profiles may advantageously make it easier to replace a device without having to manually reload those applications and certificates not included in the standard information technology (IT) build. Some embodiments may also enable the ability to easily issue a temporary device. Some embodiments may advantageously increase productivity and decrease time spent manually managing accounts. Similar and even greater advantages may accrue in the public sector for embodiments of a PPA, where the frequency of device refresh is at a more rapid pace than the business/government sector.

Secure Access Control Provision Examples

Figure 5:
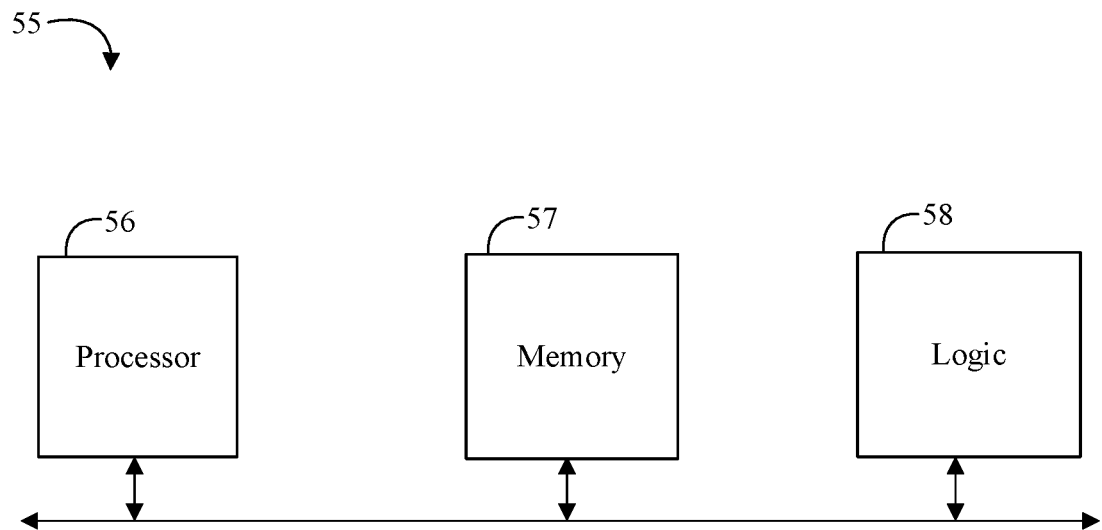
FIG. 5 is a block diagram of another example of an electronic processing system according to an embodiment.

Turning now to FIG. 5, an embodiment of an electronic processing system 55 may include a processor 56, memory 57 communicatively coupled to the processor 56, and logic 58 communicatively coupled to the processor 56 to define one or more entitlement parameters corresponding to a security asset, associate the one or more entitlement parameters to an access control parameter, and automatically provision access to the security asset based on one or more of the entitlement parameters, the access control parameter, an attribute of a requester, and a role of the requester. In some embodiments, the logic 58 may be further configured to determine if further verification is required to provision access to the security asset, and direct a request for the further verification to an approver based on one or more of the entitlement parameters, the access control parameter, an attribute of a requester, and a role of the requester. For example, the logic 58 may also be configured to automatically audit one or more of provisioned accesses to the security asset and outstanding requests for further verification. For example, the security asset may include a card reader. In some embodiments, the logic 58 may be located in, or co-located with, various components, including the processor 56 (e.g., on a same die).

Embodiments of each of the above processor 56, memory 57, logic 58, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 57, persistent storage media, or other system memory may store a set of instructions which when executed by the processor 56 cause the system 55 to implement one or more components, features, or aspects of the system 55 (e.g., the logic 58, defining one or more entitlement parameters corresponding to a security asset, associating the one or more entitlement parameters to an access control parameter, automatically provisioning access to the security asset, etc.).

Figure 6:
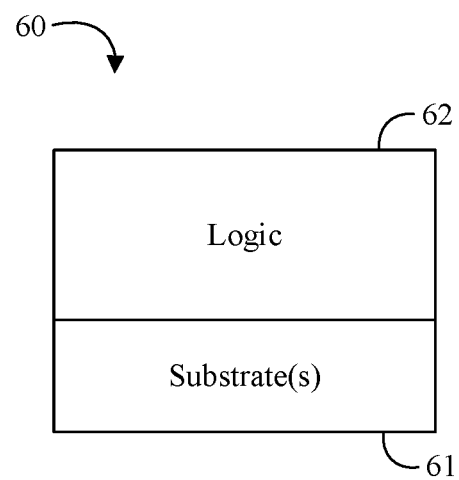
FIG. 6 is a block diagram of another example of a semiconductor package apparatus according to an embodiment.

Turning now to FIG. 6, an embodiment of a semiconductor package apparatus 60 may include one or more substrates 61, and logic 62 coupled to the one or more substrates 61, wherein the logic 62 is at least partly implemented in one or more of configurable logic and fixed-functionality hardware logic. The logic 62 coupled to the one or more substrates 61 may be configured to define one or more entitlement parameters corresponding to a security asset, associate the one or more entitlement parameters to an access control parameter, and automatically provision access to the security asset based on one or more of the entitlement parameters, the access control parameter, an attribute of a requester, and a role of the requester. In some embodiments, the logic 62 may be further configured to determine if further verification is required to provision access to the security asset, and direct a request for the further verification to an approver based on one or more of the entitlement parameters, the access control parameter, an attribute of a requester, and a role of the requester. For example, the logic 62 may also be configured to automatically audit one or more of provisioned accesses to the security asset and outstanding requests for further verification. For example, the security asset may include a card reader. In some embodiments, the logic 62 coupled to the one or more substrates 61 may include transistor channel regions that are positioned within the one or more substrates 61.

Embodiments of logic 62, and other components of the apparatus 60, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 60 may implement one or more aspects of the method 70 (FIG. 7), or any of the embodiments discussed herein. In some embodiments, the illustrated apparatus 60 may include the one or more substrates 61 (e.g., silicon, sapphire, gallium arsenide) and the logic 62 (e.g., transistor array and other integrated circuit/IC components) coupled to the substrate(s) 61. The logic 62 may be implemented at least partly in configurable logic or fixed-functionality logic hardware. In one example, the logic 62 may include transistor channel regions that are positioned (e.g., embedded) within the substrate(s) 61. Thus, the interface between the logic 62 and the substrate(s) 61 may not be an abrupt junction. The logic 62 may also be considered to include an epitaxial layer that is grown on an initial wafer of the substrate(s) 61.

Figure 7:
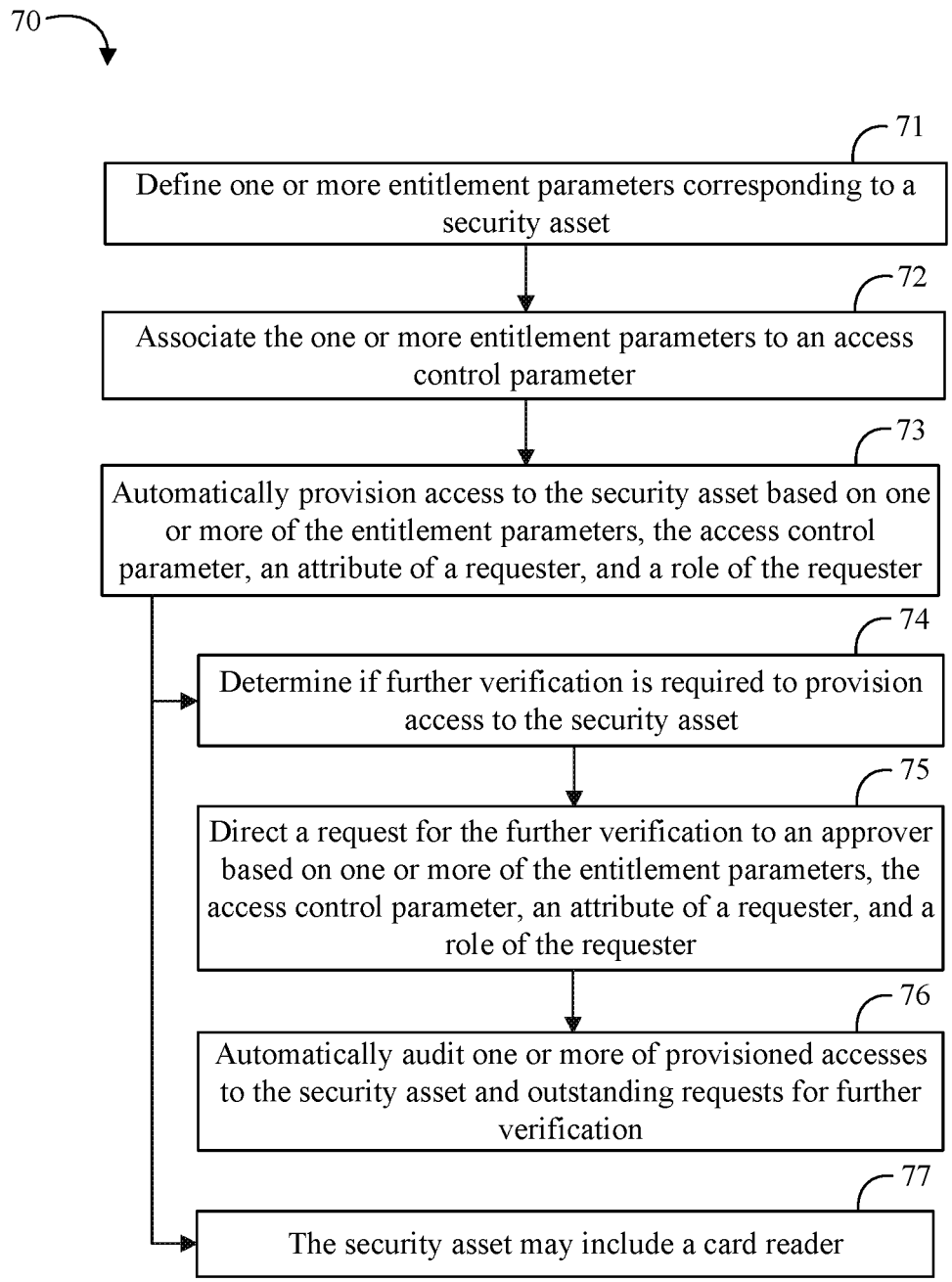
FIG. 7 is a flowchart of an example of a method of access control provisioning according to an embodiment.

Turning now to FIG. 7, an embodiment of a method 70 of access control provisioning may include defining one or more entitlement parameters corresponding to a security asset at block 71, associating the one or more entitlement parameters to an access control parameter at block 72, and automatically provisioning access to the security asset based on one or more of the entitlement parameters, the access control parameter, an attribute of a requester, and a role of the requester at block 73. Some embodiments of the method 70 may further include determining if further verification is required to provision access to the security asset at block 74, and directing a request for the further verification to an approver based on one or more of the entitlement parameters, the access control parameter, an attribute of a requester, and a role of the requester at block 75. The method 70 may also include automatically auditing one or more of provisioned accesses to the security asset and outstanding requests for further verification at block 76. For example, the security asset may include a card reader at block 77.

Embodiments of the method 70 may be implemented in a system, apparatus, computer, device, etc., for example, such as those described herein. More particularly, hardware implementations of the method 70 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 70 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 70 may be implemented on a computer readable medium as described in connection with Examples 45 to 48 below. Embodiments or portions of the method 70 may be implemented in firmware, applications (e.g., through an application programming interface (API)), or driver software running on an operating system (OS). Additionally, logic instructions for the method 70 might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide a security access control provisioning module (APM). Conventionally, physical access to card reader controlled doors may be managed by a manual, time consuming open ended process with little auditability. Requests for access may be either verbal or via e-mail and forwarded to a security badge office to be processed. There may be no controls in place to validate and justify the access requests and they are simply processed by the security department. Auditing may also be a manual process, typically scheduled on an annual basis. This entire manual process may be labor intensive, and may result in headcount and labor overhead to manually add and removing individuals' access to card readers, to run and delivery of reports, and to audit access lists by the room/card reader owners.

In some environments, a conventional approach has been a one to many approach (e.g., one person has access to many card readers). Some security access control systems may utilize an 'access area' and/or an 'access group' to administer the process. An access area may be created for a group of readers nested under a single entitlement. By assigning a person a single access area that person gets more than one card reader assigned to them. For example, a lab may have four entrances protected by respective card readers. A single access area may be created that includes all four card readers. Thereafter, that one access area may be assigned to a person (e.g., or their associated badge) and that equates to the four associated card readers.

An access group may be created for a group of access areas nested under a single entitlement. A person/badge may be assigned a single access group and that person may then get more than one access area and each access area may contain multiple card readers. For example, a campus 'general access group' may contains the general access areas from each building, where each building's access area may contain every entry point to that building. By creating a single access group that includes all general access areas for each building, one access group may be assigned to a person/badge and that may equate to all of the readers contained in every access area associated to the access group.

To manage entitlements in this fashion is very labor intensive and is not a closed loop system. Typically, a security department (e.g., a security badge office) will develop and maintain a matrix of reader and their associations to access areas and access groups. When a person requests access to a card reader controlled door the security badge office personnel have to manually review the matrix to determine if there is an exact match of access areas and access groups that fits the request. If not, the security personnel may need to create a new access area or access group to meet that person's access entitlement request. However, the matrix may get very large and it is not uncommon for security personnel to select a close match to the person's entitlement request. This may result in people having access to card readers beyond what they originally requested.

The process to request and approve access may also be manual and/or error-prone. A person will typically send a room owner an e-mail requesting access to their card reader controlled door. If approved by the room owner, the person or room-owner will send the security badge office an e-mail requesting that the person who needs access is granted access. Security typically does nothing more than search out the entitlement and assign to the person as described above. The room owners are expected review who has access to their card readers for auditing purposes. This may happen annually and the room owner may be provided with a list of names of everyone who has access to their card readers. This list could be several people to several thousand people. Because the room owner may have no idea why so many people have access they request that the security badge office personnel remove access from anyone they don't know. This starts the cycle all over again and over the next year everyone who lost access that the room owner did not recognize (e.g., janitors, emergency responders, etc.) request access again and are typically granted access, only to have it removed at the end of the year during the auditing process.

Advantageously, some or all of the foregoing problems may be reduced or eliminated by some embodiments of an APM as described herein. In some embodiments, the APM may be implemented as a module to provide a bolt-on, closed-loop entitlement management application that may automate the process, close the approval loop, and ensure that auditing is an automated process and not a manual process requiring headcount and human glue to hold the access control provisioning process together. Some embodiments may also link legacy hardware platforms and legacy access control systems to the APM by supporting legacy access areas and access group, while reducing or eliminating the manual effort typically required to manual manage the environment.

Figure 8:
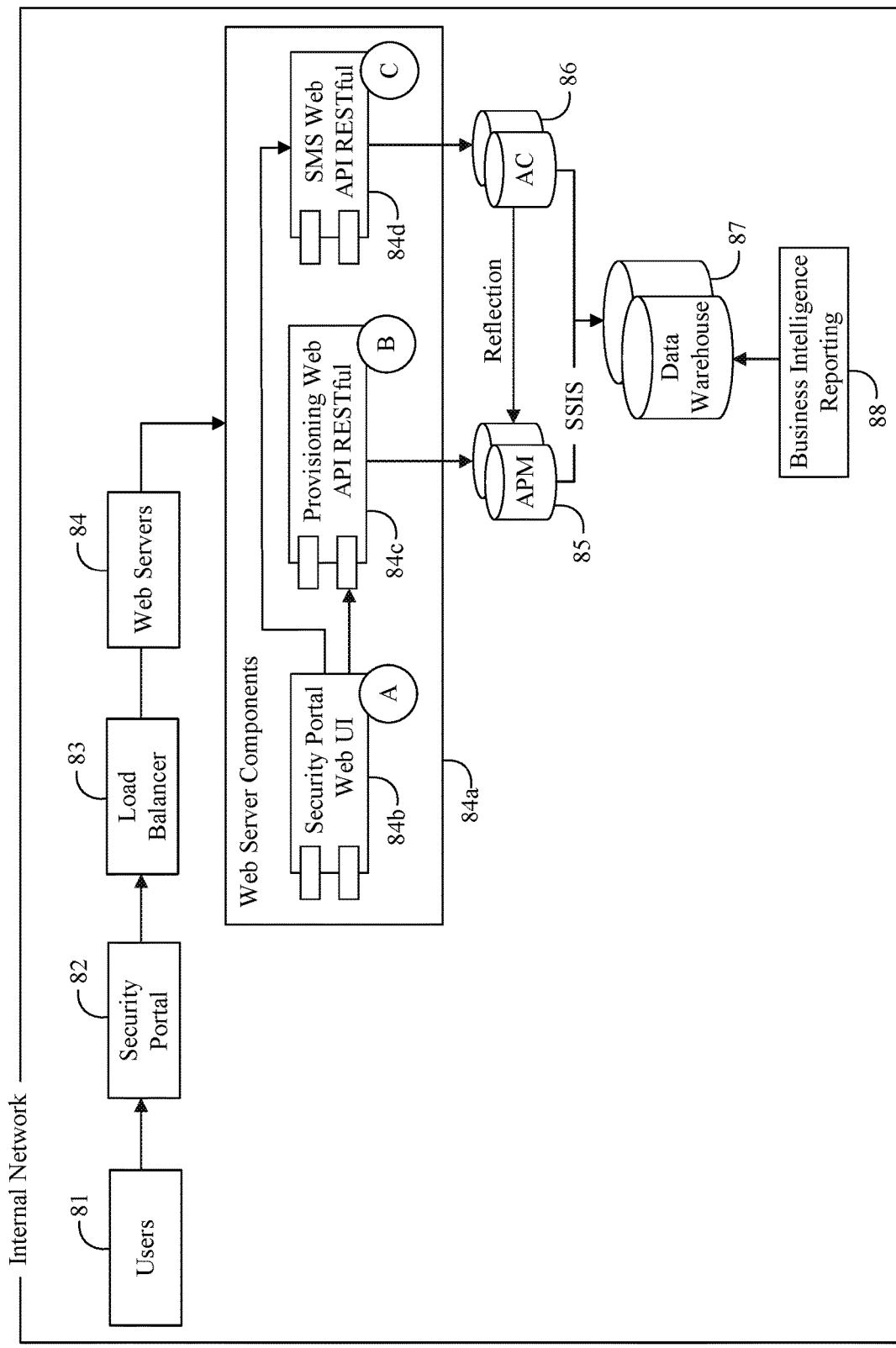
FIG. 8 is a block diagram of an example of an internal system architecture according to an embodiment.

Turning now to FIG. 8, an embodiment of an internal network 80 may include one or more users 81 which may connect through a security portal 82 and a load balancer 83 to one or more web servers 84. An example web server 84a may include one or more web server components such as a security portal web user interface (UI) 84b, a provisioning web API 84c (e.g., RESTFUL), and a security management system (SMS) web API 84d (e.g., RESTFUL). The web servers 84 may be communicatively coupled to one or more APMs 85 (e.g., through the provisioning web API 84c), and also to one or more access control modules (ACs) 86 (e.g., through the SMS web API 84d). The APMs 85 and the ACs 86 may synchronize to each other and may also each be communicatively coupled to one or more data warehouses 87. For example, replication from the ACs 86 to database(s) on the APMs 85 may allow for synchronizing AC data such as person profile and access areas to the APM database(s). A business intelligence reporting module 88 may also be communicatively coupled to the data warehouses 87. For example, each of nodes A, B, and C may include an ASP.NET core framework, a .NET framework, an ENTITYFRAMEWORK interface, and/or an NLOG interface. The node A may further include a BOOTSTRAP interface, a JQUERY interface, and/or INTEL MLAF.

In some embodiments, the APM may be implemented as a web application which allows a card reader owner the ability to manage the work flow to determine who can gain access and who approves access. Some embodiments may also allow the use of attributes to create role based access that may, or may not, require access entitlement approval. In some embodiments, auditing may be accomplished through the use of expiring access or entitlements. Other business systems may also be integrated to monitor a worker's employment status, changes to their organizational or reporting hierarchy, etc. Some embodiments may include validation of training to ensure that only those individuals have had proper training (e.g., safety, privacy, IP management, etc.) are allowed access. In some embodiments, individuals from controlled countries may be properly vetted before given access to areas containing controlled IP. In some embodiments, the workflow process may be facilitated through e-mail and automated links for quick and easy review of requests and approval or denial of access.

Some embodiments may manage both physical entitlements and logical entitlements, with the technology for managing physical entitlements being similar to the approach of managing logical entitlements. Because of the unique attributes associated with physical entitlement management, however, some embodiments of an APM may blend the legacy requirements with next generation concepts to provide a very robust solution.

In some embodiments, managing physical entitlements may start with the creation of the entitlement and its associated attributes. For example, a single reader entitlement (e.g., one lab, one door, one card reader) may be distinguished from a multi-reader access area (e.g., where gaining access through the entry door may have other internal readers that also need to be comprehended, such as offices). Some embodiments may advantageously support access management based on roles (e.g., role-based access). For example, the room owner may determine what roles they want to automatically grant access to the room owner's areas (e.g., everyone in their department, everyone in their organization unit, etc.). The roles available for the room owner to select may be expanded to include service roles (e.g., janitorial services, facility maintenance, etc.). Some roles may be mandatory and/or pre-assigned (e.g., emergency responders, security, executive staff members, etc.). The room owner may see that the pre-assigned/mandatory roles have access to the room owner's areas, but may be obligated to allow that access. Seeing the roles associated with a person's access, and/or rules associated with the roles, may help avoid inadvertent access removal by the room owner.

In addition to allowing the room owner to determine who is allowed in the room owner's area, some embodiments of an APM may allow the room owner to determine how the approvals and denials are managed. For example, the room owner, may or may not be the approver. Some embodiments may create an approval hierarchy. The approval hierarchy may indicate whether a person's manager needs to approve, the manager's delegates may approve, any role-based approval (e.g., a role manager may approve on behalf of the room owner for the role for their staff (janitorial, facilities, security, etc.), etc. Some embodiments of the APM may also allow the room owner to determine if there any special considerations that need to be met prior to granting access (e.g., special training, IP management, controlled country restrictions, etc.). Some embodiments may then allow the room owner to associate the defined entitlements parameters to the access control system areas or groups.

A person needing access to an entitlement may go to the APM (e.g., a web application) and search for the entitlement (e.g., using a fuzzy logic wild card test search, following a tree hierarchy starting at the corporate level, drilling down to region, site, campus, building and floor to find the reader, etc.). The person may then request access to the entitlement, provide justification as needed, and indicate the timeframe needed for the access (e.g., which may be limited to some maximum timeframe for auditing purposes). Before the entitlement request is submitted to the workflow, some embodiments of the APM may apply business rules. If training, controlled country controls, etc. are indicated, for example, the systems of record may be queried to validate that all such criteria are met. If not, the requestor may be denied and provided an indication of what criteria is not met (e.g., or otherwise why the request was denied).

In some embodiments, after the entitlement request is submitted an e-mail notification with links may be used to alert approvers and allow approval or denial of requests along with comments. For some requests, a role-based approval delegate or certifier may be inserted into the approval cycle so that by the time the final approval e-mail is sent to the card reader entitlement approver they can be confident that due diligence has been performed and the request is valid and legitimate before they give final approval. After an entitlement request has been approved, the security access control system may be sent the transaction and the access may be automatically applied.

In some embodiments, an entitlement may be configured to auto approve based on attributes of the worker. Advantageously, the APM may be configured to bypass the human approval process to further simplify the workflow. For example, employees may automatically be granted access to some entitlements but contingent workers may be put through a decision flow to assure business need for access to the entitlement.

Some embodiments of an APM may support automatic auditing. For example, a duration may be applied to a person's entitlement which may require that the person re-justify their need for access on some periodic basis. If there are training requirements that need to be met, for example, the person must keep their training current or they may lose access. By monitoring the human resources system, for example, if a person is terminated or their role changes (e.g., change in predefined access attributes, department number, etc.), their access entitlements may be rescinded and those transactions may automatically be processed by the security access control system. Some embodiments of an APM may include built-in synchronization between the APM and the AC system. For example, access may not be provisioned from the APM but access may be managed by the APM. The AC may automatically remove access that is not indicated in the APM and may automatically add access that is indicated in the APM.

Some embodiments of an APM may advantageously provide customer empowerment. Conventionally, space owners may have had to rely on the security organization to make changes to the behavior of their card readers. In some embodiments of the APM, the space owner may have the control to assign approvers, define mandatory training and training renewals, define renewal periods as well as be able to assign renewal periods that are exempted from mandatory training. Space owners may determine what role-based access may access their space and see what roles are mandatory to have access to their space (e.g., through an opt in/opt out feature). Space owners may also define who can be a data administrator on their behalf which may allow bulk loading and entitlement configuration controls.

Some embodiments of an APM may advantageously position access control for future technology by supporting role-based access, expiring and non-expiring access, etc., which may be applied to the card reader level (e.g., instead of or in addition to access control at the security access control system level). In some applications, embodiments may be applied to the card reader to allow the card reader itself to manage some or all role-based access by embedding the attributes into the card reader itself.

Through automation, configurable workflows, role-based access provisioning, integration to other lines of business systems and the security access control system, some embodiments of an APM may significantly reduce manual effort and labor. Some embodiments may provide a closed loop system and support an automatic auditable process to authenticate who should have access and who can approve an individual's access to secured areas.

Security Data Conversion Examples

Figure 9:
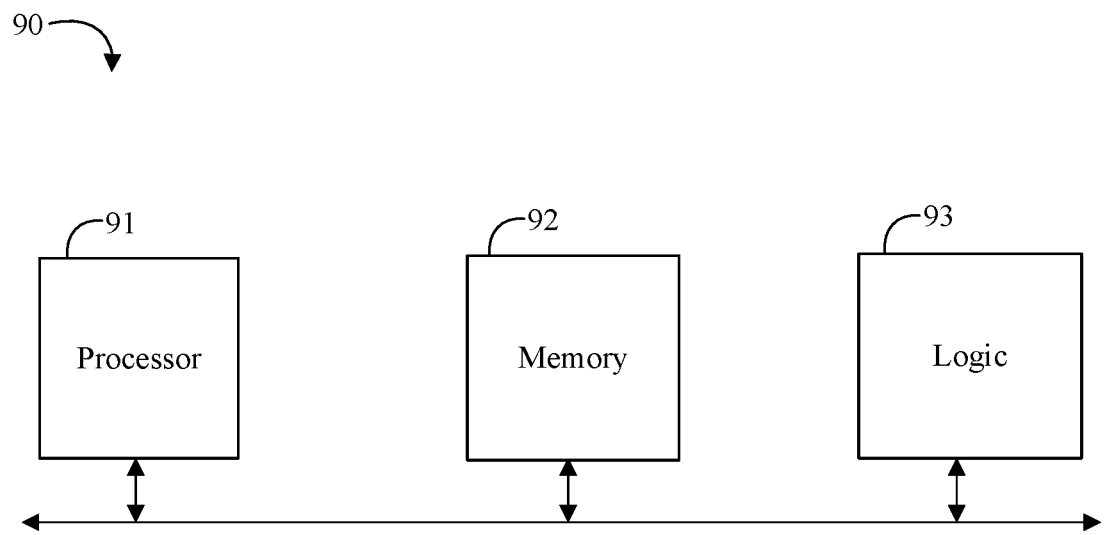
FIG. 9 is a block diagram of another example of an electronic processing system according to an embodiment.

Turning now to FIG. 9, an embodiment of an electronic processing system 90 may include a processor 91, memory 92 communicatively coupled to the processor 91, and logic 93 communicatively coupled to the processor 91 to stage security information in an intermediate format, and convert the intermediate format to a destination format. In some embodiments, the logic 93 may be further configured to validate the intermediate format prior to the conversion of the intermediate format to a destination format. For example, the logic 93 may be configured to align one or more attributes from the intermediate format with the destination format, and identify one or more missing attributes from the intermediate format with respect to the destination format. In any of the embodiments herein, the security information may include one or more of security device information, access permission information, schedule information, and link information.

Embodiments of each of the above processor 91, memory 92, logic 93, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 92, persistent storage media, or other system memory may store a set of instructions which when executed by the processor 91 cause the system 90 to implement one or more components, features, or aspects of the system 90 (e.g., the logic 93, to staging security information in an intermediate format, converting the intermediate format to a destination format, etc.).

Figure 10:
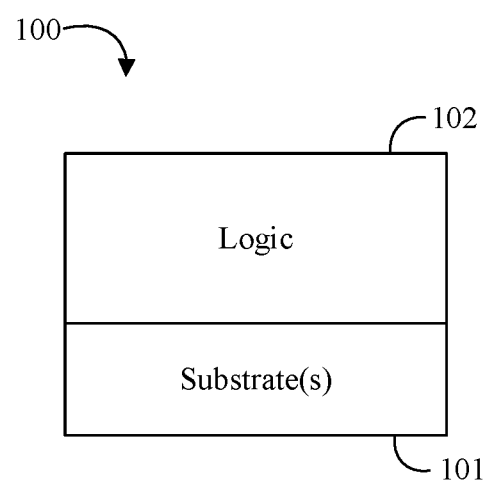
FIG. 10 is a block diagram of another example of a semiconductor package apparatus according to an embodiment.

Turning now to FIG. 10, an embodiment of a semiconductor package apparatus 100 may include one or more substrates 101, and logic 102 coupled to the one or more substrates 101, wherein the logic 102 is at least partly implemented in one or more of configurable logic and fixed-functionality hardware logic. The logic 102 coupled to the one or more substrates 101 may be configured to stage security information in an intermediate format, and convert the intermediate format to a destination format. In some embodiments, the logic 102 may be further configured to validate the intermediate format prior to the conversion of the intermediate format to a destination format. For example, the logic 102 may be configured to align one or more attributes from the intermediate format with the destination format, and identify one or more missing attributes from the intermediate format with respect to the destination format. In any of the embodiments herein, the security information may include one or more of security device information, access permission information, schedule information, and link information. In some embodiments, the logic 102 coupled to the one or more substrates 101 includes transistor channel regions that are positioned within the one or more substrates 101.

Embodiments of logic 102, and other components of the apparatus 100, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 100 may implement one or more aspects of the method 110 (FIG. 11), or any of the embodiments discussed herein. In some embodiments, the illustrated apparatus 100 may include the one or more substrates 101 (e.g., silicon, sapphire, gallium arsenide) and the logic 102 (e.g., transistor array and other integrated circuit/IC components) coupled to the substrate(s) 101. The logic 102 may be implemented at least partly in configurable logic or fixed-functionality logic hardware. In one example, the logic 102 may include transistor channel regions that are positioned (e.g., embedded) within the substrate(s) 101. Thus, the interface between the logic 102 and the substrate(s) 101 may not be an abrupt junction. The logic 102 may also be considered to include an epitaxial layer that is grown on an initial wafer of the substrate(s) 101.

Figure 11:
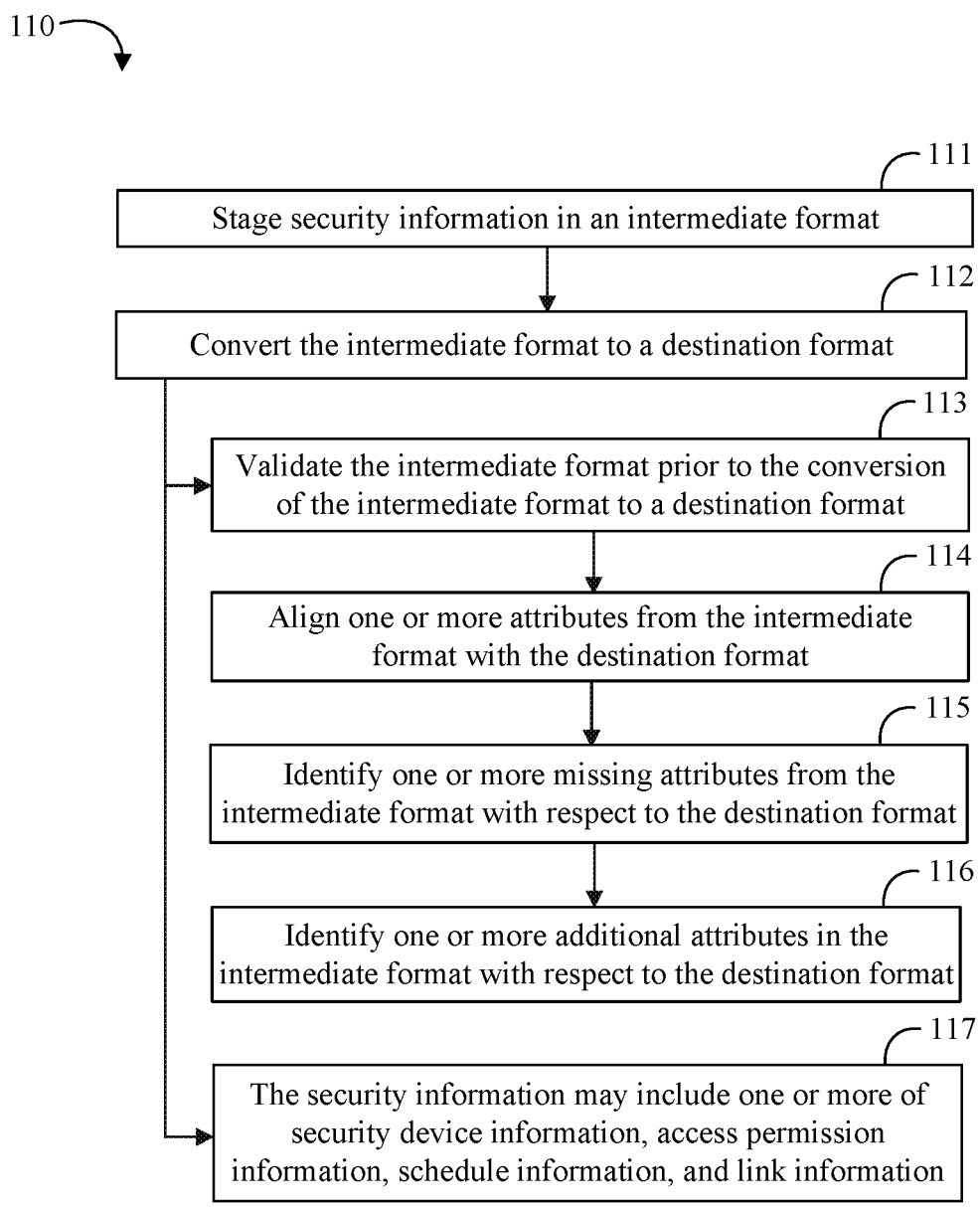
FIG. 11 is a flowchart of an example of a method of converting security information according to an embodiment.

Turning now to FIG. 11, an embodiment of a method 110 of converting security information may include staging security information in an intermediate format at block 111, and converting the intermediate format to a destination format at block 112. Some embodiments of the method 110 may further include validating the intermediate format prior to the conversion of the intermediate format to a destination format at block 113. For example, the method 110 may include aligning one or more attributes from the intermediate format with the destination format at block 114, identifying one or more missing attributes from the intermediate format with respect to the destination format at block 115 and identifying one or more additional attributes in the intermediate format with respect to the destination format at block 116. In any of the embodiments herein, the security information may include one or more of security device information, access permission information, schedule information, and link information at block 117.

Embodiments of the method 110 may be implemented in a system, apparatus, computer, device, etc., for example, such as those described herein. More particularly, hardware implementations of the method 110 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 110 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 110 may be implemented on a computer readable medium as described in connection with Examples 66 to 69 below. Embodiments or portions of the method 110 may be implemented in firmware, applications (e.g., through an application programming interface (API)), or driver software running on an operating system (OS). Additionally, logic instructions for the method 110 might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide a security data conversion module. Generally speaking, the security industry may be considered largely proprietary. For example, a manufacturer's application, database, and/or hardware communication protocol may be proprietary to that manufacturer's product. In many installations, much of the hardware itself (e.g., access control panels) may be privately labeled and custom firmware may be installed to make it compatible with a manufacturer's software platform. For example, Manufacturer A and Manufacturer B may manufacture access control hardware. Such hardware may be integrated into many different access control companies' software products. For example, a security management system (SMS) may be implemented to be hardware agnostic and/or compatible with access control hardware from more than one hardware manufacturer.

Some other approaches to inter-mingled security hardware may require custom conversion routines for various data interactions. A problem with this approach is that, for every new access control system conversion, a new custom conversion routine may need to be developed (e.g., which may be costly and time consuming). Additionally, in some cases the developer of these routines must be, or become, familiar with the source and destination database structure and all table associations, which requires someone with significant database skills to analyze and create the conversion routines. Some embodiments of a security data conversion module may overcome one or more of the foregoing problems.

Some embodiments may advantageously provide a user-friendly, universal conversion module (UCM). Some embodiments of the UCM may allow the off the shelf reporting capabilities of the source system to export the access control system data into a file format (e.g., XML, CSV, EXCEL, etc.) that may be consumed by the UCM to import the data into the intermediate staging tables where the data can be validated and manipulated to match the destination format and naming conventions before being processed through to the destination SMS access control system. Advantageously, some embodiments may accomplish such conversion by a knowledgeable security system user and not a development resource (e.g., programmer, database expert, etc.).

In some embodiments, running the reports from the source system may expose the majority of the data required to successfully import into the SMS including, for example, device data (e.g., access control panels, card readers, input sensors (e.g., door status, motion sensor, etc.), output controllers (e.g., lights, sirens, etc.), etc.), access permission data (e.g., access areas, access groups, etc.), schedule data (e.g., time zones, etc.), and link data (e.g., input/output, activity/events, global, etc.). In some embodiments, the data may be exported and staged to be validated and modified prior to the SMS import. During the staging the data may be manipulated to align all attributes, naming conventions, data formats and missing attributes, required to align with the SMS valid data elements. For example, headers may be created to match the SMS table structures and the data may be mapped to align with its associated SMS data elements. Data validation may also be applied to ensure that only valid data and data types may be allowed into the import step. Additionally, during the validation step the data element (e.g., card readers, inputs, outputs, etc.) counts may be validated along with spot data integrity from source to staged tables.

In some embodiments, the initial work may occur in a development environment. After the process has been refined and the data has been visually validated the next step include moving into a pre-production environment. In the pre-production environment, an end-to-end test of the process developed in the development environment may be recreated. Additionally, physical devices may be connected during the end-to-end testing for hardware testing, panel downloads may occur, hardware device functionality may be tested, access permissions may be validated, schedules may be tested, links may be validated, etc. In some embodiments, each time a conversion is created an instance of the routines may be saved and may be applied to future conversions.

Figure 12:
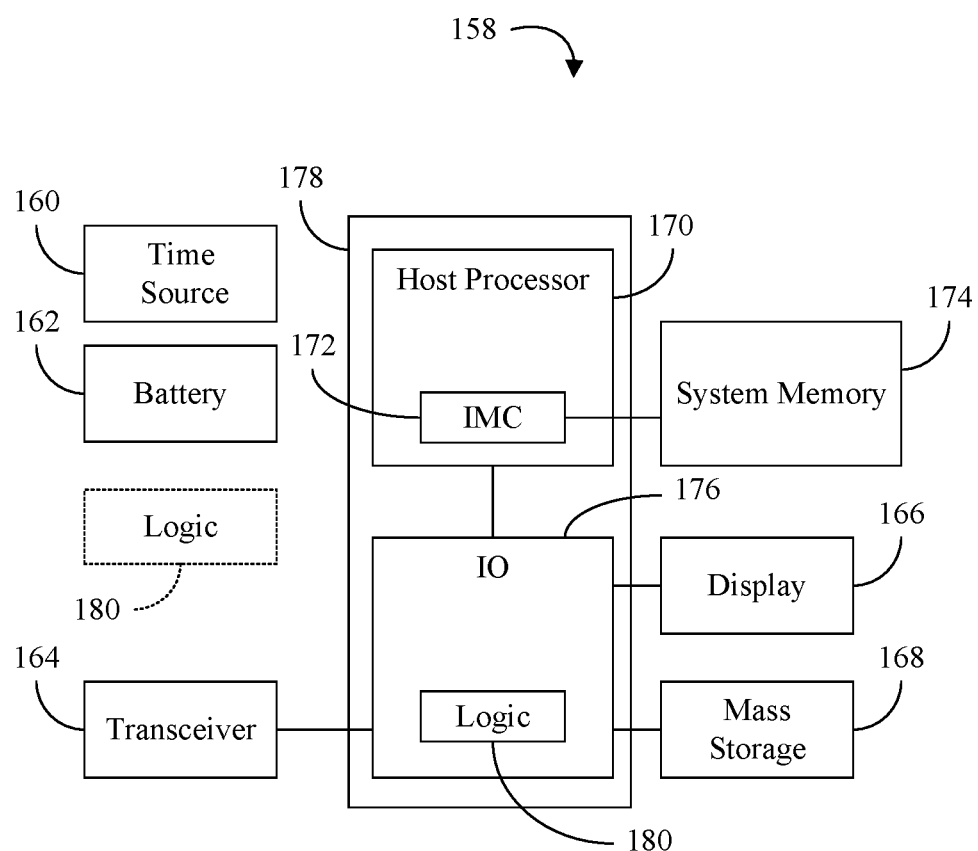
FIG. 12 is a block diagram of an example of a computing device according to an embodiment.

FIG. 12 shows a computing device 158 that may be readily substituted for one or more of the system 10 (FIG. 1), the system 50 (FIG. 5), and/or the system 90 (FIG. 9), already discussed. In the illustrated example, the device 158 includes a time source 160 (e.g., crystal oscillator, clock), a battery 162 to supply power to the device 158, a transceiver 164 (e.g., wireless or wired), a display 166 and mass storage 168 (e.g., hard disk drive/HDD, solid state disk/SSD, optical disk, flash memory). The device 158 may also include a host processor 170 (e.g., CPU) having an integrated memory controller (IMC) 172, which may communicate with system memory 174. The system memory 174 may include, for example, dynamic random access memory (DRAM) configured as one or more memory modules such as, for example, dual inline memory modules (DIMMs), small outline DIMMs (SODIMMs), etc. The illustrated device 158 also includes an input output (IO) module 176 implemented together with the processor 170 on a semiconductor die 178 as a system on chip (SoC), wherein the IO module 176 functions as a host device and may communicate with, for example, the display 166, the transceiver 164, the mass storage 168, and so forth. The mass storage 168 may include non-volatile memory (NVM) that stores one or more keys (e.g., MAC generation keys, encryption keys).

The IO module 176 may include logic 180 that causes the semiconductor die 178 to operate as a CPA, an APM, and/or a UCM, as described herein. In one example, the time source 160 is autonomous/independent from the controller in order to enhance security (e.g., to prevent the controller from tampering with cadence, frequency, latency and/or timestamp data). The logic 180 may also be implemented elsewhere in the device 158.

Figure 13:
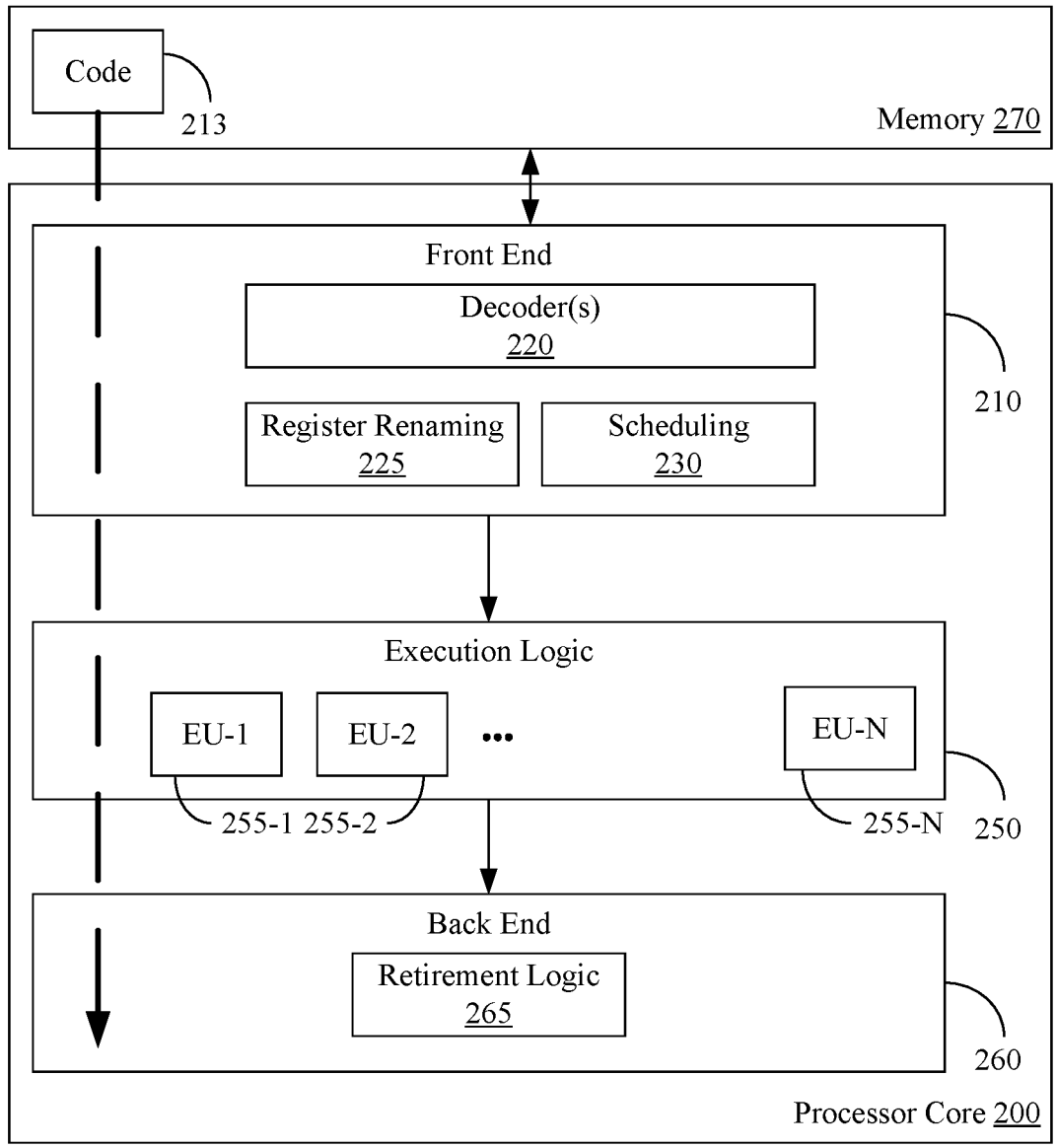
FIG. 13 is a block diagram of an example of a processor according to an embodiment.

FIG. 13 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 13, a processing element may alternatively include more than one of the processor core 200 illustrated in FIG. 13. The processor core 200 may be a single-threaded core or, for at least one embodiment, the processor core 200 may be multithreaded in that it may include more than one hardware thread context (or "logical processor") per core.

FIG. 13 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30 (FIGS. 3A to 3C), the method 70 (FIG. 7), and/or the method 110 (FIG. 11), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 13, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 14:
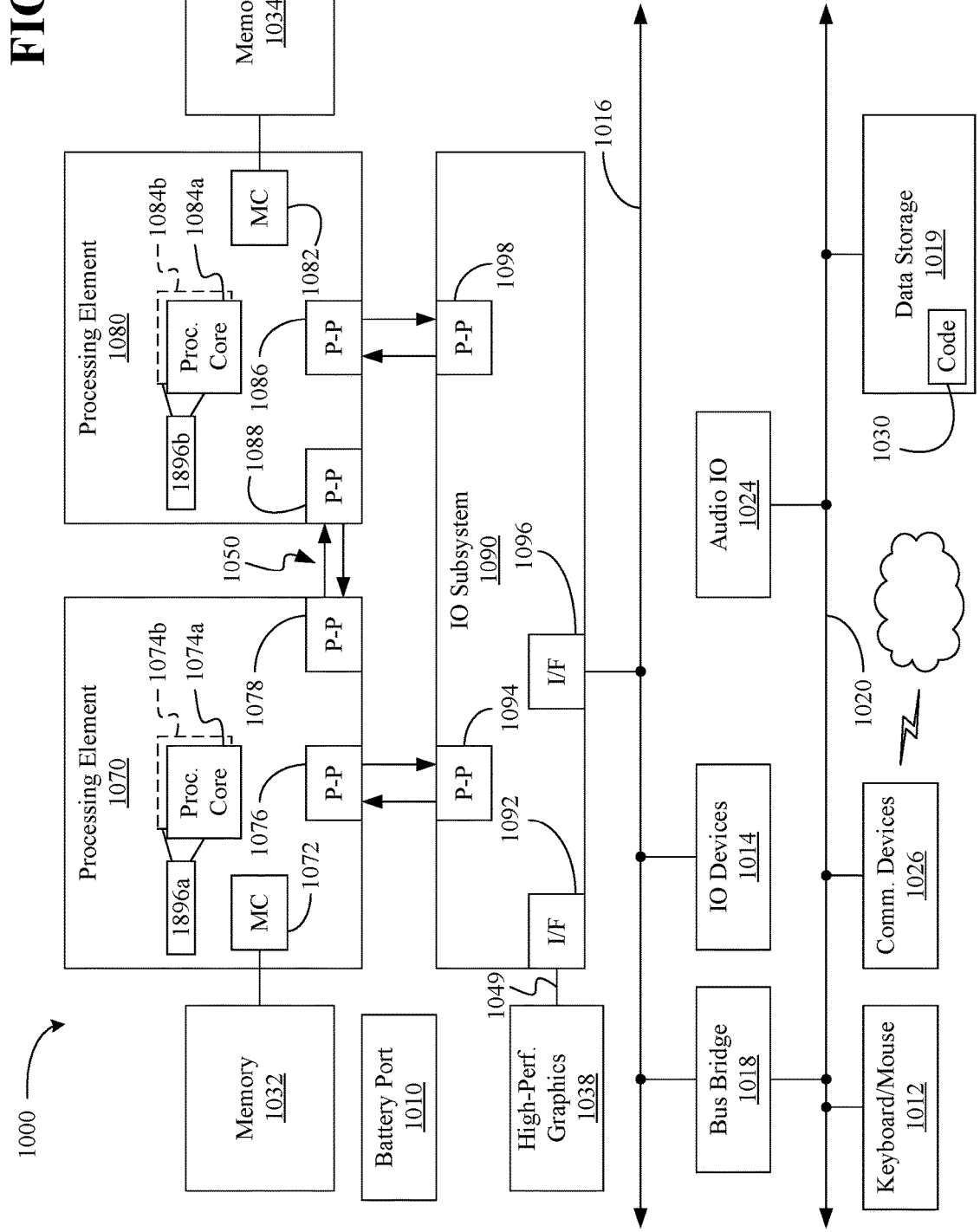
FIG. 14 is a block diagram of an example of a computing system according to an embodiment.

Referring now to FIG. 14, shown is a block diagram of a computing system 1000 embodiment in accordance with an embodiment. Shown in FIG. 14 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 14 may be implemented as a multi-drop bus rather than point-to-point interconnect.

As shown in FIG. 14, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 13.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 14, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 14, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 14, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 30 (FIGS. 3A to 3C), the method 70 (FIG. 7), and/or the method 110 (FIG. 11), already discussed, and may be similar to the code 213 (FIG. 13), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 14, a system may implement a multi-drop bus or another such communication topology. Also, the elements of FIG. 14 may alternatively be partitioned using more or fewer integrated chips than shown in FIG. 14.

Additional Notes and Examples

Example 1 may include an electronic processing system, comprising a processor, memory communicatively coupled to the processor, and logic communicatively coupled to the processor to provision data associated with a plurality of devices, detect a first machine-to-machine update request with respect to a first device in the plurality of devices, and automatically update at least a portion of the provisioned data in response to the first machine-to-machine update request.

Example 2 may include the system of Example 1, wherein the provisioned data includes one or more of applications, encryption keys, secured links or digital certificates.

Example 3 may include the system of Example 1, wherein the logic is further to detect a machine-to-human update request with respect to a second device in the plurality of devices, and automatically update at least a portion of the provisioned data in response to the machine-to-human update request.

Example 4 may include the system of Example 1, wherein the logic is further to detect a human-to-machine update request with respect to a third device in the plurality of devices, and automatically update at least a portion of the provisioned data in response to the human-to-machine update request.

Example 5 may include the system of Example 1, wherein the provisioned data is further associated with a plurality of user accounts and wherein the logic is further to detect a second machine-to-machine update request with respect to a first user account in the plurality of user accounts, and automatically update at least a portion of the provisioned data in response to the second machine-to-machine update request.

Example 6 may include the system of any of Examples 1 to 5, wherein the logic is further to securely store the provisioned data to a central repository.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to provision data associated with a plurality of devices, detect a first machine-to-machine update request with respect to a first device in the plurality of devices, and automatically update at least a portion of the provisioned data in response to the first machine-to-machine update request.

Example 8 may include the apparatus of Example 7, wherein the provisioned data includes one or more of applications, encryption keys, secured links or digital certificates.

Example 9 may include the apparatus of Example 7, wherein the logic is further to detect a machine-to-human update request with respect to a second device in the plurality of devices, and automatically update at least a portion of the provisioned data in response to the machine-to-human update request.

Example 10 may include the apparatus of Example 7, wherein the logic is further to detect a human-to-machine update request with respect to a third device in the plurality of devices, and automatically update at least a portion of the provisioned data in response to the human-to-machine update request.

Example 11 may include the apparatus of Example 7, wherein the provisioned data is further associated with a plurality of user accounts and wherein the logic is further to detect a second machine-to-machine update request with respect to a first user account in the plurality of user accounts, and automatically update at least a portion of the provisioned data in response to the second machine-to-machine update request.

Example 12 may include the apparatus of any of Examples 7 to 11, wherein the logic is further to securely store the provisioned data to a central repository.

Example 13 may include the apparatus of any of Examples 7 to 12, wherein the logic coupled to the one or more substrates includes transistor channel regions that are positioned within the one or more substrates.

Example 14 may include a method of provisioning data, comprising provisioning data associated with a plurality of devices, detecting a first machine-to-machine update request with respect to a first device in the plurality of devices, and automatically updating at least a portion of the provisioned data in response to the first machine-to-machine update request.

Example 15 may include the method of Example 14, wherein the provisioned data includes one or more of applications, encryption keys, secured links or digital certificates.

Example 16 may include the method of Example 14, further comprising detecting a machine-to-human update request with respect to a second device in the plurality of devices, and automatically updating at least a portion of the provisioned data in response to the machine-to-human update request.

Example 17 may include the method of Example 14, further comprising detecting a human-to-machine update request with respect to a third device in the plurality of devices, and automatically updating at least a portion of the provisioned data in response to the human-to-machine update request.

Example 18 may include the method of Example 14, wherein the provisioned data is further associated with a plurality of user accounts, further comprising detecting a second machine-to-machine update request with respect to a first user account in the plurality of user accounts, and automatically updating at least a portion of the provisioned data in response to the second machine-to-machine update request.

Example 19 may include the method of any of Examples 14 to 18, further comprising securely storing the provisioned data to a central repository.

Example 20 may include at least one computer readable storage medium, comprising a set of instructions, which when executed by a computing device, cause the computing device to provision data associated with a plurality of devices, detect a first machine-to-machine update request with respect to a first device in the plurality of devices, and automatically update at least a portion of the provisioned data in response to the first machine-to-machine update request.

Example 21 may include the at least one computer readable storage medium of Example 20, wherein the provisioned data includes one or more of applications, encryption keys, secured links or digital certificates.

Example 22 may include the at least one computer readable storage medium of Example 20, comprising a further set of instructions, which when executed by the computing device, cause the computing device to detect a machine-to-human update request with respect to a second device in the plurality of devices, and automatically update at least a portion of the provisioned data in response to the machine-to-human update request.

Example 23 may include the at least one computer readable storage medium of Example 20, comprising a further set of instructions, which when executed by the computing device, cause the computing device to detect a human-to-machine update request with respect to a third device in the plurality of devices, and automatically update at least a portion of the provisioned data in response to the human-to-machine update request.

Example 24 may include the at least one computer readable storage medium of Example 20, wherein the provisioned data is further associated with a plurality of user accounts, comprising a further set of instructions, which when executed by the computing device, cause the computing device to detect a second machine-to-machine update request with respect to a first user account in the plurality of user accounts, and automatically update at least a portion of the provisioned data in response to the second machine-to-machine update request.

Example 25 may include the at least one computer readable storage medium of any of Examples 20 to 24, comprising a further set of instructions, which when executed by the computing device, cause the computing device to securely store the provisioned data to a central repository.

Example 26 may include a central data provision apparatus, comprising means for provisioning data associated with a plurality of devices, means for detecting a first machine-to-machine update request with respect to a first device in the plurality of devices, and means for automatically updating at least a portion of the provisioned data in response to the first machine-to-machine update request.

Example 27 may include the apparatus of Example 26, wherein the provisioned data includes one or more of applications, encryption keys, secured links or digital certificates.

Example 28 may include the apparatus of Example 26, further comprising means for detecting a machine-to-human update request with respect to a second device in the plurality of devices, and means for automatically updating at least a portion of the provisioned data in response to the machine-to-human update request.

Example 29 may include the apparatus of Example 26, further comprising means for detecting a human-to-machine update request with respect to a third device in the plurality of devices, and means for automatically updating at least a portion of the provisioned data in response to the human-to-machine update request.

Example 30 may include the apparatus of Example 26, wherein the provisioned data is further associated with a plurality of user accounts, further comprising means for detecting a second machine-to-machine update request with respect to a first user account in the plurality of user accounts, and means for automatically updating at least a portion of the provisioned data in response to the second machine-to-machine update request.

Example 31 may include the apparatus of any of Examples 26 to 30, further comprising means for securely storing the provisioned data to a central repository.

Example 32 may include an electronic processing system, comprising a processor, memory communicatively coupled to the processor, and logic communicatively coupled to the processor to define one or more entitlement parameters corresponding to a security asset, associate the one or more entitlement parameters to an access control parameter, and automatically provision access to the security asset based on one or more of the entitlement parameters, the access control parameter, an attribute of a requester, and a role of the requester.

Example 33 may include the system of Example 32, wherein the logic is further to determine if further verification is required to provision access to the security asset, and direct a request for the further verification to an approver based on one or more of the entitlement parameters, the access control parameter, an attribute of a requester, and a role of the requester.

Example 34 may include the system of Example 33, wherein the logic is further to automatically audit one or more of provisioned accesses to the security asset and outstanding requests for further verification.

Example 35 may include the system of any of Examples 32 to 34, wherein the security asset comprises a card reader.

Example 36 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to define one or more entitlement parameters corresponding to a security asset, associate the one or more entitlement parameters to an access control parameter, and automatically provision access to the security asset based on one or more of the entitlement parameters, the access control parameter, an attribute of a requester, and a role of the requester.

Example 37 may include the apparatus of Example 36, wherein the logic is further to determine if further verification is required to provision access to the security asset, and direct a request for the further verification to an approver based on one or more of the entitlement parameters, the access control parameter, an attribute of a requester, and a role of the requester.

Example 38 may include the apparatus of Example 37, wherein the logic is further to automatically audit one or more of provisioned accesses to the security asset and outstanding requests for further verification.

Example 39 may include the apparatus of any of Examples 36 to 38, wherein the security asset comprises a card reader.

Example 40 may include the apparatus of any of Examples 36 to 39, wherein the logic coupled to the one or more substrates includes transistor channel regions that are positioned within the one or more substrates.

Example 41 may include a method of access control provisioning, comprising defining one or more entitlement parameters corresponding to a security asset, associating the one or more entitlement parameters to an access control parameter, and automatically provisioning access to the security asset based on one or more of the entitlement parameters, the access control parameter, an attribute of a requester, and a role of the requester.

Example 42 may include the method of Example 41, further comprising determining if further verification is required to provision access to the security asset, and directing a request for the further verification to an approver based on one or more of the entitlement parameters, the access control parameter, an attribute of a requester, and a role of the requester.

Example 43 may include the method of Example 42, further comprising automatically auditing one or more of provisioned accesses to the security asset and outstanding requests for further verification.

Example 44 may include the method of any of Examples 41 to 43, wherein the security asset comprises a card reader.

Example 45 may include at least one computer readable storage medium, comprising a set of instructions, which when executed by a computing device, cause the computing device to define one or more entitlement parameters corresponding to a security asset, associate the one or more entitlement parameters to an access control parameter, and automatically provision access to the security asset based on one or more of the entitlement parameters, the access control parameter, an attribute of a requester, and a role of the requester.

Example 46 may include the at least one computer readable storage medium of Example 45, comprising a further set of instructions, which when executed by the computing device, cause the computing device to determine if further verification is required to provision access to the security asset, and direct a request for the further verification to an approver based on one or more of the entitlement parameters, the access control parameter, an attribute of a requester, and a role of the requester.

Example 47 may include the at least one computer readable storage medium of Example 46, comprising a further set of instructions, which when executed by the computing device, cause the computing device to automatically audit one or more of provisioned accesses to the security asset and outstanding requests for further verification.

Example 48 may include the at least one computer readable storage medium of any of Examples 45 to 47, wherein the security asset comprises a card reader.

Example 49 may include an access control provision apparatus, comprising means for defining one or more entitlement parameters corresponding to a security asset, means for associating the one or more entitlement parameters to an access control parameter, and means for automatically provisioning access to the security asset based on one or more of the entitlement parameters, the access control parameter, an attribute of a requester, and a role of the requester.

Example 50 may include the apparatus of Example 49, further comprising means for determining if further verification is required to provision access to the security asset, and means for directing a request for the further verification to an approver based on one or more of the entitlement parameters, the access control parameter, an attribute of a requester, and a role of the requester.

Example 51 may include the apparatus of Example 50, further comprising means for automatically auditing one or more of provisioned accesses to the security asset and outstanding requests for further verification.

Example 52 may include the apparatus of any of Examples 49 to 51, wherein the security asset comprises a card reader.

Example 53 may include an electronic processing system, comprising a processor, memory communicatively coupled to the processor, and logic communicatively coupled to the processor to stage security information in an intermediate format, and convert the intermediate format to a destination format.

Example 54 may include the system of Example 53, wherein the logic is further to validate the intermediate format prior to the conversion of the intermediate format to a destination format.

Example 55 may include the system of Example 54, wherein the logic is further to align one or more attributes from the intermediate format with the destination format, and identify one or more missing attributes from the intermediate format with respect to the destination format.

Example 56 may include the system of any of Examples 53 to 55, wherein the security information includes one or more of security device information, access permission information, schedule information, and link information.

Example 57 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to stage security information in an intermediate format, and convert the intermediate format to a destination format.

Example 58 may include the apparatus of Example 57, wherein the logic is further to validate the intermediate format prior to the conversion of the intermediate format to a destination format.

Example 59 may include the apparatus of Example 58, wherein the logic is further to align one or more attributes from the intermediate format with the destination format, and identify one or more missing attributes from the intermediate format with respect to the destination format.

Example 60 may include the apparatus of any of Examples 57 to 59, wherein the security information includes one or more of security device information, access permission information, schedule information, and link information.

Example 61 may include the apparatus of any of Examples 57 to 60, wherein the logic coupled to the one or more substrates includes transistor channel regions that are positioned within the one or more substrates.

Example 62 may include a method of converting security information, comprising staging security information in an intermediate format, and converting the intermediate format to a destination format.

Example 63 may include the method of Example 62, further comprising validating the intermediate format prior to the conversion of the intermediate format to a destination format.

Example 64 may include the method of Example 63, further comprising aligning one or more attributes from the intermediate format with the destination format, and identifying one or more missing attributes from the intermediate format with respect to the destination format.

Example 65 may include the method of any of Examples 62 to 64, wherein the security information includes one or more of security device information, access permission information, schedule information, and link information.

Example 66 may include at least one computer readable storage medium, comprising a set of instructions, which when executed by a computing device, cause the computing device to stage security information in an intermediate format, and convert the intermediate format to a destination format.

Example 67 may include the at least one computer readable storage medium of Example 66, comprising a further set of instructions, which when executed by the computing device, cause the computing device to validate the intermediate format prior to the conversion of the intermediate format to a destination format.

Example 68 may include the at least one computer readable storage medium of Example 67, comprising a further set of instructions, which when executed by the computing device, cause the computing device to align one or more attributes from the intermediate format with the destination format, and identify one or more missing attributes from the intermediate format with respect to the destination format.

Example 69 may include the at least one computer readable storage medium of any of Examples 66 to 68, wherein the security information includes one or more of security device information, access permission information, schedule information, and link information.

Example 70 may include a security information conversion apparatus, comprising means for staging security information in an intermediate format, and means for converting the intermediate format to a destination format.

Example 71 may include the apparatus of Example 70, further comprising means for validating the intermediate format prior to the conversion of the intermediate format to a destination format.

Example 72 may include the apparatus of Example 71, further comprising means for aligning one or more attributes from the intermediate format with the destination format, and means for identifying one or more missing attributes from the intermediate format with respect to the destination format.

Example 73 may include the apparatus of any of Examples 70 to 72, wherein the security information includes one or more of security device information, access permission information, schedule information, and link information.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
logic communicatively coupled to the processor to:
provision data associated with a first device, wherein provisioned data includes two or more applications associated with two or more service providers and one or more of an encryption key, a secured link, or a digital certificate associated with an application of the two or more applications, wherein the two or more service providers represent disparate provisioning bodies and at least one application of the two or more applications is not originally present in the first device,
detect a machine-to-machine request from a second device that is to replace the first device,
automatically build the second device based on at least a portion of the provisioned data in response to the machine-to-machine request, and
securely store the provisioned data to a central repository, wherein the central repository is to provide a secure way to reload device applications, keys and certificates, and to serve as a bridge between the disparate provisioning bodies to expand interoperability between the first device and the second device.

2. The system of claim 1, wherein the logic is to automatically download the two or more of applications and one or more of the encryption key, the secured link, or the digital certificate to automatically build the second device.

3. The system of claim 2, wherein the logic is further to:
detect a machine-to-human request with respect to the second device via a prompt that steps through the provisioned data and allows a user to determine which of the two or more applications were loaded in the first device; and
automatically build the second device further based on user input in response to the machine-to-human request.

4. The system of claim 2, wherein the logic is further to:
detect a human-to-machine request with respect to the second device via a launch of a provisioning application to build the second device and a user authentication to access the provisioned data; and
automatically build the second device further based on user input in response to the human-to-machine request.

5. The system of claim 2, wherein the logic is further to:
generate a key associated with the build of the second device;
assign the key to the second device; and
use the key to update the provisioned data with one or more of a new application, a new key, or a new certificate for the second device.

6. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
provision data associated with a first device, wherein provisioned data includes two or more applications associated with two or more service providers and one or more of an encryption key, a secured link, or a digital certificate associated with an application of the two or more applications, wherein the two or more service providers represent disparate provisioning bodies and at least one application of the two or more applications is not originally present in the first device,
detect a machine-to-machine request from a second device that is to replace the first device,
automatically build the second device based on at least a portion of the provisioned data in response to the machine-to-machine request, and
securely store the provisioned data to a central repository, wherein the central repository is to provide a secure way to reload device applications, keys and certificates, and to serve as a bridge between the disparate provisioning bodies to expand interoperability between the first device and the second device.

7. The apparatus of claim 6, wherein the logic is to automatically download the two or more of applications and one or more of the encryption key, the secured link, or the digital certificate to automatically build the second device.

8. The apparatus of claim 7, wherein the logic is further to:
detect a machine-to-human request with respect to the second device via a prompt that steps through the provisioned data and allows a user to determine which of the two or more applications were loaded in the first device; and
automatically build the second device further based on user input in response to the machine-to-human request.

9. The apparatus of claim 7, wherein the logic is further to:
detect a human-to-machine request with respect to the second device via a launch of a provisioning application to build the second device and a user authentication to access the provisioned data; and
automatically build the second device further based on user input data in response to the human-to-machine request.

10. The apparatus of claim 7, wherein the logic is further to:
generate a key associated with the build of the second device;
assign the key to the second device; and
use the key to update the provisioned data with one or more of a new application, a new key, or a new certificate for the second device.

11. The apparatus of claim 6, wherein the logic coupled to the one or more substrates includes transistor channel regions that are positioned within the one or more substrates.

12. A method of provisioning data, comprising:
provisioning data associated with a first device, wherein provisioned data includes two or more applications associated with two or more service providers and one or more of an encryption key, a secured link, or a digital certificate associated with an application of the two or more applications, wherein the two or more service providers represent disparate provisioning bodies and at least one application of the two or more applications is not originally present in the first device;
detecting a machine-to-machine request from a second device that is to replace the first device;

automatically building the second device based on at least a portion of the provisioned data in response to the machine-to-machine request; and securely store the provisioned data to a central repository, wherein the central repository is to provide a secure way to reload device applications, keys and certificates, and to serve as a bridge between the disparate provisioning bodies to expand interoperability between the first device and the second device.

13. The method of claim 12, including automatically downloading the two or more of applications and one or more of the encryption key, the secured link, or the digital certificate to automatically build the second device.

14. The method of claim 13, further comprising:
detecting a machine-to-human request with respect to the second device via a prompt that steps through the provisioned data and allows a user to determine which of the two or more applications were loaded in the first device; and
automatically building the second device further based on user input in response to the machine-to-human request.

15. The method of claim 13, further comprising:
detecting a human-to-machine request with respect to the second device via a launch of a provisioning application to build the second device and a user authentication to access the provisioned data; and
automatically building the second device further based on user input in response to the human-to-machine request.

16. The method of claim 13, further comprising:
generating a key associated with the build of the second device;
assigning the key to the second device; and
using the key to update the provisioned data with one or more of a new application, a new key, or a new certificate for the second device.

17. At least one non-transitory computer readable storage medium, comprising a set of instructions, which when executed by a computing device, cause the computing device to:
provision data associated with a first device, wherein provisioned data includes two or more applications associated with two or more service providers and one or more of an encryption key, a secured link, or a digital certificate associated with an application of the two or more applications, wherein the two or more service providers represent disparate provisioning bodies and at least one application of the two or more applications is not originally present in the first device;
detect a machine-to-machine request from a second device that is to replace the first device;
automatically build the second device based on at least a portion of the provisioned data in response to the machine-to-machine request; and
securely store the provisioned data to a central repository, wherein the central repository is to provide a secure way to reload device applications, keys and certificates, and to serve as a bridge between the disparate provisioning bodies to expand interoperability between the first device and the second device.

18. The at least one non-transitory computer readable storage medium of claim 17, wherein the computing device is to automatically download the two or more of applications and one or more of the encryption key, the secured link, or the digital certificate to automatically build the second device.

19. The at least one non-transitory computer readable storage medium of claim 18, wherein the computing device is to:
detect a machine-to-human request with respect to the second device via a prompt that steps through the provisioned data and allows a user to determine which of the two or more applications were loaded in the first device; and
automatically build the second device in response to the machine-to-human request.

20. The at least one non-transitory computer readable storage medium of claim 18, wherein the computing device is to:
detect a human-to-machine request with respect to the second device via a launch of a provisioning application to build the second device and a user authentication to access the provisioned data; and
automatically build the second device further based on user input in response to the human-to-machine request.

21. The at least one non-transitory computer readable storage medium of claim 18, wherein the computing device is to:
generate a key associated with the build of the second device;
assign the key to the second device; and
use the key to update the provisioned data with one or more of a new application, a new key, or a new certificate for the second device.

22. The at least one non-transitory computer readable storage medium of claim 17, comprising a further set of instructions, which when executed by the computing device, cause the computing device to:
define one or more entitlement parameters corresponding to a security asset;
associate the one or more entitlement parameters to an access control parameter; and
automatically provision access to the security asset based on one or more of the entitlement parameters, the access control parameter, an attribute of a requester, and a role of the requester.

* * * * *